(12) United States Patent
Kim

(10) Patent No.: US 11,870,098 B2
(45) Date of Patent: Jan. 9, 2024

(54) SECONDARY BATTERY INCLUDING AN ADHESIVE PART

(71) Applicant: Samsung SDI Co., Ltd., Yongin-si (KR)

(72) Inventor: Jae Hyung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 18/059,881

(22) Filed: Nov. 29, 2022

(65) Prior Publication Data

US 2023/0088248 A1 Mar. 23, 2023

Related U.S. Application Data

(62) Division of application No. 17/497,619, filed on Oct. 8, 2021.

(30) Foreign Application Priority Data

Oct. 13, 2020 (KR) .................. 10-2020-0132206

(51) Int. Cl.
*H01M 50/46* (2021.01)
*H01M 50/198* (2021.01)

(52) U.S. Cl.
CPC ....... *H01M 50/461* (2021.01); *H01M 50/198* (2021.01)

(58) Field of Classification Search
CPC .................. H01M 50/461; H01M 50/198
See application file for complete search history.

(56) References Cited

U.S. PATENT DOCUMENTS

2009/0280406 A1 11/2009 Kozuki

FOREIGN PATENT DOCUMENTS

| CN | 110071322 A | * | 7/2019 | ........ H01M 10/0413 |
| KR | 10-0905390 | | 6/2009 | |
| KR | 20090131445 A | * | 12/2009 | .......... H01M 50/463 |
| KR | 10-2016-0075197 A | | 6/2016 | |
| KR | 10-2016-0110090 A | | 9/2016 | |

OTHER PUBLICATIONS

U.S. Office Action dated Jan. 20, 2023, issued in U.S. Appl. No. 17/497,619 (10 pages).
U.S. Final Office Action dated Apr. 20, 2023, issued in U.S. Appl. No. 17/497,619 (11 pages).

* cited by examiner

*Primary Examiner* — Jimmy Vo
(74) *Attorney, Agent, or Firm* — Lewis Roca Rothgerber Christie LLP

(57) ABSTRACT

A secondary battery includes: an electrode assembly including a negative electrode plate, a positive electrode plate, and a separator between the negative electrode plate and the positive electrode plate; and a case accommodating the electrode assembly. The electrode assembly includes an adhesive part on an outermost region of the electrode assembly. The adhesive part is arranged to cover a boundary line between the negative electrode plate and the separator or between the positive electrode plate and the separator, and is bonded to the case.

6 Claims, 5 Drawing Sheets
(2 of 5 Drawing Sheet(s) Filed in Color)

US 11,870,098 B2

SECONDARY BATTERY INCLUDING AN ADHESIVE PART

CROSS-REFERENCE TO RELATED APPLICATION

This application is a divisional of U.S. patent application Ser. No. 17/497,619, filed Oct. 8, 2021, which claims priority to and the benefit of Korean Patent Application No. 10-2020-0132206, filed on Oct. 13, 2020 in the Korean Intellectual Property Office, the entire disclosure of which is incorporated herein by reference.

BACKGROUND

1. Field

Aspects of embodiments of the present invention relate to a secondary battery.

2. Description of the Related Art

Secondary batteries each include: an electrode assembly that includes a positive electrode, a negative electrode, a separator interposed between the positive electrode and the negative electrode; and a case that accommodates the electrode assembly with an electrolyte. The electrode assembly is provided as a structure in which a plurality of electrode assemblies are stacked. Also, the electrode assembly is provided as a roll form in which an electrode assembly is wound in a direction, and this is typically referred to as a jelly roll.

In the electrode assembly, a binder is used to fix the positive electrode, the negative electrode, and the separator so as to maintain a state in which the positive electrode, the negative electrode, and the separator are stacked. Also, a plurality of protective tapes may be used to reduce damage due to impact when the secondary battery is dropped.

However, edge portions of the electrode assembly, which are not coated with the binder, are vulnerable to impact when dropped. Thus, the electrode assembly may be damaged due to curling or tearing of the separator.

The above information disclosed in this section of "Description of the Related Art" is provided for enhancement of understanding of the background of the present invention, and therefore it may contain information that does not form the related art.

SUMMARY

According to an aspect of embodiments of the present invention, a secondary battery in which an electrode assembly has an improved binding structure, thereby minimizing or reducing damage of the electrode assembly (e.g., a jelly roll) due to dropping impact, is provided.

According to one or more embodiments, a secondary battery includes: an electrode assembly including a negative electrode plate, a positive electrode plate, and a separator between the negative electrode plate and the positive electrode plate; and a case configured to accommodate the electrode assembly, wherein the electrode assembly includes an adhesive part on an outermost region of the electrode assembly, wherein the adhesive part is provided to cover a boundary line between the negative electrode plate and the separator or between the positive electrode plate and the separator, and is bonded to the case.

The electrode assembly may include: a first surface and a second surface, which are positioned at outermost regions of the electrode assembly and face away from each other; and a third surface and a fourth surface, which have smaller areas than the first surface and the second surface and connect the first surface to the second surface, wherein the adhesive part is on either the first surface or the second surface or on both the first surface and the second surface.

The adhesive part may cover a region of about 20% to about 100% of a length (L2) which is from the boundary line (L1) between the negative electrode plate and the separator or between the positive electrode plate and the separator to an end of the separator.

The case may include: a recess which is an accommodation space configured to accommodate the electrode assembly; and a sealing portion at an outer circumferential edge of the recess and sealed after the electrode assembly is accommodated, wherein the case has a surface that faces the adhesive part.

An area of the adhesive part may be about 30% or more of an area of the first surface or the second surface.

A thickness of the adhesive part may be about 1 μm to about 50 μm.

The electrode assembly may further include a tape which is attached to an end on the adhesive part adjacent to the boundary line (L1) between the negative electrode plate and the separator or between the positive electrode plate and the separator.

According to one or more embodiments, a secondary battery includes: an electrode assembly including a first electrode plate, a second electrode plate, and a separator between the first electrode plate and the second electrode plate; a case configured to accommodate the electrode assembly; and an adhesive part on an outermost region of the electrode assembly, wherein the adhesive part is adjacent to an end of the separator beyond a boundary line (L1) between the separator and the first or second electrode plate, and is bonded to the case in a state in which the electrode assembly is accommodated in the case.

The electrode assembly may include: a first surface and a second surface, which are positioned at outermost regions of the electrode assembly and face away from each other; and a third surface and a fourth surface, which have relatively smaller areas than the first surface and the second surface and connect the first surface to the second surface, wherein the adhesive part is on either the first surface or the second surface or on both the first surface and the second surface.

The adhesive part may cover a region of about 20% to about 100% of a length (L2) which is from the boundary line (L1) between the separator and the first or second electrode plate to the end of the separator.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings are included to provide a further understanding of the present disclosure, and are incorporated in and constitute a part of this specification. The drawings illustrate some embodiments of the present disclosure and, together with the description, serve to explain principles of the present disclosure. The patent or application file contains at least one drawing executed in color. Copies of this patent or patent application publication with color drawing(s) will be provided by the Office upon request and payment of the necessary fee. In the drawings.

DETAILED DESCRIPTION

Figure 1:
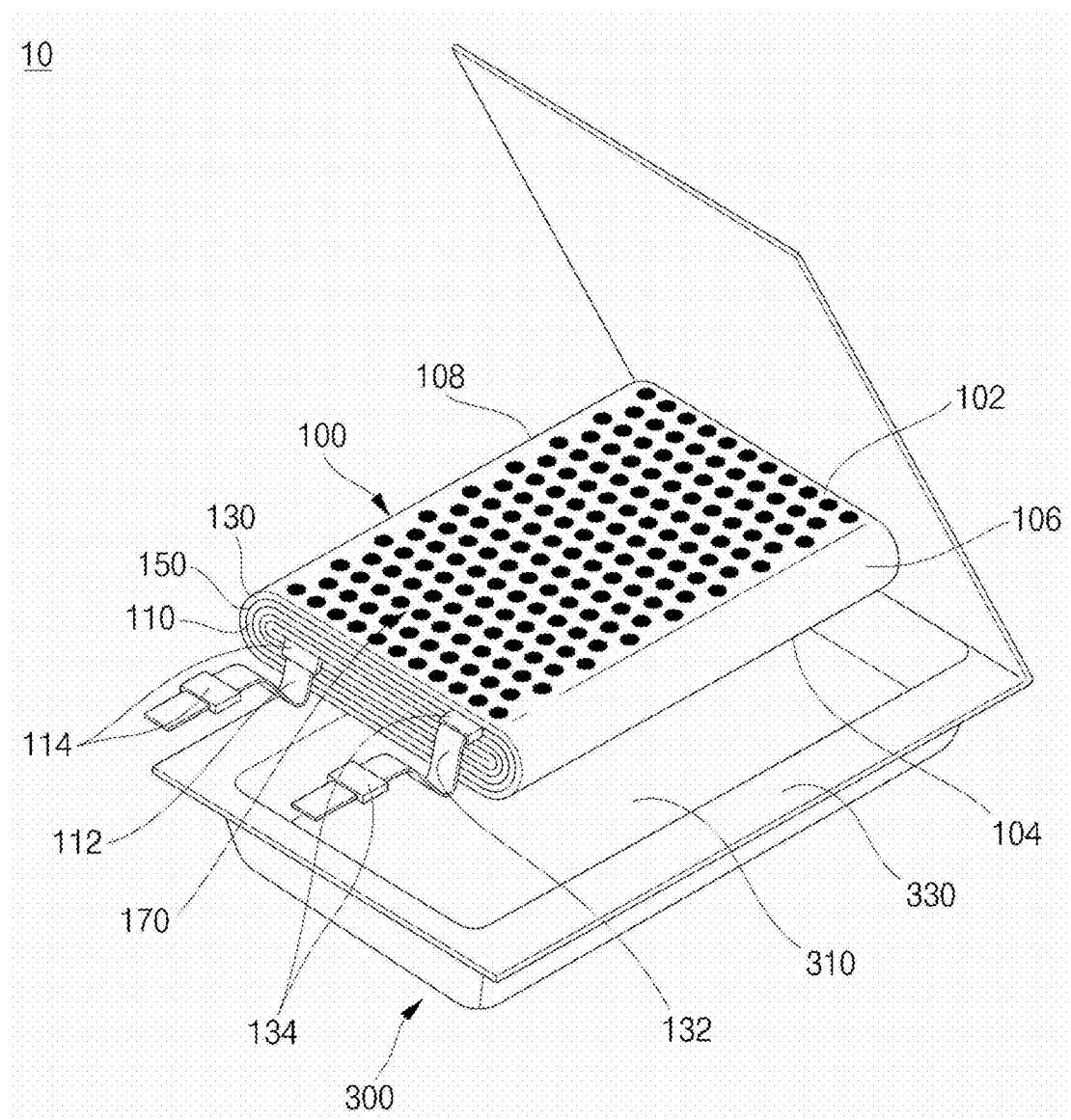
FIG. 1 is a partially exploded perspective view illustrating a secondary battery according to an embodiment of the present disclosure.

Some embodiments of the present disclosure are provided to more fully describe the present disclosure to those skilled in the art. The following embodiments may be modified in many different forms, and the scope of the present disclosure is not limited to the following embodiments. Rather, these embodiments are provided so that this disclosure will be thorough and complete, and will fully convey the concept of the present disclosure to those skilled in the art.

In the drawings, the thickness and size of components or layers may be exaggerated for convenience of explanation and clarity, and like reference numerals refer to like elements throughout. As used in this specification, the term "and/or" includes any and all combinations of one or more of the associated listed items. Also, in this specification, it is to be understood that when an element A is referred to as being "connected to" an element B, the element A may be directly connected to the element B, or one or more intervening elements C may be present between the elements A and B such that the element A may be indirectly connected to the element B.

The terminology used herein is for the purpose of describing particular embodiments and is not intended to be limiting of the disclosure. As used herein, the singular forms are intended to include the plural forms as well, unless the context clearly indicates otherwise. Also, it is to be further understood that the terms "comprise" or "include" and/or "comprising" or "including," when used in this specification, specify the presence of stated features, numbers, steps, operations, members, elements, and/or groups thereof, but do not preclude the presence or addition of one or more other features, numbers, steps, operations, members, elements, and/or groups thereof.

It is to be understood that, although the terms "first," "second," etc. may be used herein to describe various members, components, regions, layers, and/or portions, these members, components, regions, layers, and/or portions should not be limited by these terms. These terms are used to distinguish one member, component, region, layer, or portion from another member, component, region, layer, or portion. Thus, a first member, component, region, layer, or portion which will be described may also refer to a second member, component, region, layer, or portion, without departing from the teachings of the present invention.

Spatially relative terms, such as "beneath," "below," "lower," "above," "upper," and the like, may be used herein for ease of description to describe one element's relationship to another element(s) or feature(s) as illustrated in the figures. These spatially relative terms are intended for ease of comprehension of the present invention according to various process states or usage states of the present invention, and the present invention is not limited thereto. For example, when an element or feature shown in the drawings is turned upside down, the element or feature described as "beneath" or "below" may then be "above" or "upper." Thus, the term "beneath" may encompass the term "above" or "below."

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

Herein, a secondary battery according to some embodiments of the present disclosure will be described in further detail with reference to the accompanying drawings.

Figure 2:
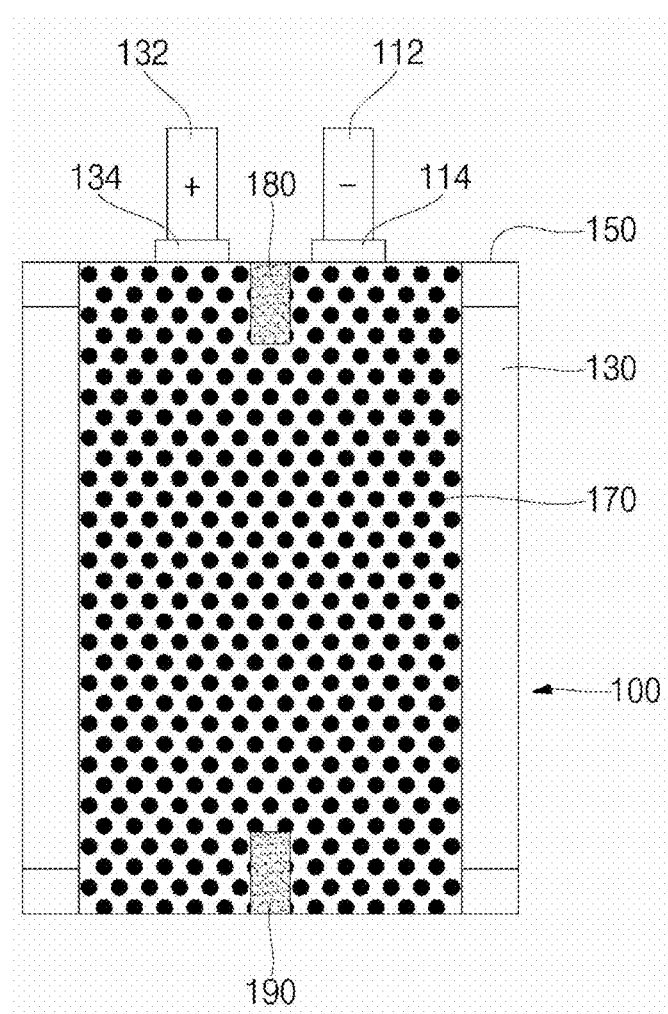
FIG. 2 is a plan view of an electrode assembly of FIG. 1.

FIG. 1 is a partially exploded perspective view illustrating a secondary battery according to an embodiment of the present disclosure; FIG. 2 is a plan view of an electrode assembly of FIG. 1; and FIG. 3 is a schematic view illustrating a portion of the electrode assembly of FIG. 2.

Figure 3:
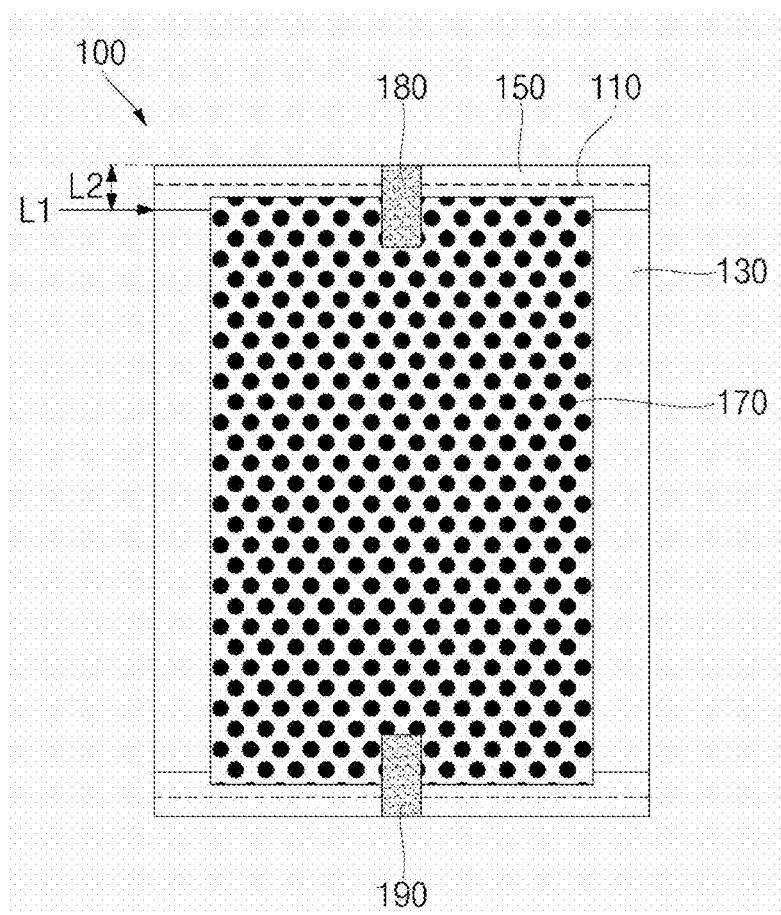
FIG. 3 is a schematic view illustrating a portion of the electrode assembly of FIG. 2.

As illustrated in FIGS. 1 to 3, a secondary battery 10 according to an embodiment of the present disclosure may include an electrode assembly 100, a case 300 which has a pouch shape to accommodate the electrode assembly 100, and an adhesive part 170 by which the electrode assembly 100 is bonded to the case 300.

As illustrated in FIG. 1, the electrode assembly 100 may include a negative electrode plate 110, a positive electrode plate 130, and a separator 150 interposed between the negative electrode plate 110 and the positive electrode plate 130. In an embodiment, the electrode assembly 100 may be a stack-type electrode assembly in which a stack of the negative electrode plate 110, the separator 150, and the positive electrode plate 130 is repeatedly stacked a plurality of times. Also, in an embodiment, the electrode assembly 100 may be a roll-type electrode assembly in which a stack of the negative electrode plate 110, the separator 150, and the positive electrode plate 130 is wound. This electrode assembly 100 may be referred to as a jelly roll. In the present disclosure, the electrode assembly 100 will be described as an example of the wound type.

As illustrated in FIGS. 1 and 2, the negative electrode plate 110 may be formed by applying a negative electrode active material to both surfaces of a negative electrode current collector plate which is made of, for example, a metal foil, such as copper, a copper alloy, nickel, or a nickel alloy. For example, a carbon-based material, Si, Sn, a tin oxide, a composite tin alloy, a transition metal oxide, or a lithium metal nitride or metal oxide may be used as the negative electrode active material. A negative electrode non-coating portion, to which the negative electrode active material is not applied, may be formed in some regions of the negative electrode current collector plate. A negative electrode tab 112 may be provided on the negative electrode non-coating portion and electrically connected to the negative electrode non-coating portion. An insulating member 114 may be attached to the negative electrode tab 112 to prevent or substantially prevent a short circuit between the negative electrode tab 112 and the case 300. In an embodiment, the negative electrode plate 110 may be relatively longer than the positive electrode plate 130 with respect to the longitudinal direction, as illustrated in FIG. 3.

As illustrated in FIGS. 1 and 2, the positive electrode plate 130 may be formed by applying a positive electrode active material to both surfaces of a positive electrode current collector plate which is made of, for example, an aluminum metal foil having excellent electrical conductivity. For example, a chalcogenide compound may be used as the positive electrode active material. Also, as an example, a composite metal oxide, such as $LiCoO_2$, $LiMn_2O_4$, $LiNiO_2$, and $LiNiMnO_2$, may be used. A positive electrode non-coating portion, to which the positive electrode active material is not applied, may be formed in some regions of the positive electrode current collector plate. A positive electrode tab 132 may be provided on the positive electrode non-coating portion and electrically connected to the positive electrode non-coating portion. An insulating member 134 may be attached to the positive electrode tab 132 to prevent or substantially prevent a short circuit between the positive electrode tab 132 and the case 300. In an embodiment, the positive electrode plate 130 may be relatively shorter than the negative electrode plate 110 with respect to the longitudinal direction, as illustrated in FIG. 3.

As illustrated in FIGS. 1 and 2, the separator 150 may be interposed between the negative electrode plate 110 and the positive electrode plate 130 to prevent or substantially prevent a short circuit therebetween. The separator 150 may include, for example, a material selected from the group consisting of polyethylene, polypropylene, and a porous copolymer of polyethylene and polypropylene. The separator 150 may be formed larger than the negative electrode plate 110 and the positive electrode plate 130 so as to prevent or substantially prevent an electrical short circuit between the negative electrode plate 110 and the positive electrode plate 130. Particularly, in an embodiment, in the longitudinal direction of FIG. 3, the separator 150 is longer than the negative electrode plate 110 that is relatively longer than the positive electrode plate 130.

The electrode assembly 100 having the above-described structure may be stacked or wound, thus providing a first surface 102 and a second surface 104, which face away from each other in an up-down direction of FIG. 1, and a third surface 106 and a fourth surface 108, which connect the first surface 102 and the second surface 104. In an embodiment, the first surface 102 and the second surface 104 may be relatively larger and flatter surfaces than the third surface 106 and the fourth surface 108. The third surface 106 and the fourth surface 108 may be surfaces corresponding to side surfaces of the electrode assembly 100 in FIG. 1, and, in an embodiment, may be relatively narrower curved surfaces than the first surface 102 and the second surface 104. The first to fourth surfaces 102 to 108 may be provided by any of the negative electrode plate 110, the positive electrode plate 130, or the separator 150 which is positioned at an outermost region when the electrode assembly 100 is stacked or wound. In the present disclosure, an embodiment in which the electrode assembly 100, which is wound such that the positive electrode plate 130 is positioned at the outermost region, will be described as an example.

The adhesive part 170, which will be described later, may be provided on the first surface 102 and/or the second surface 104. In portions except for the first to fourth surfaces 102 to 108, multi-layer structures are exposed when stacked or wound. Thus, these portions are not referred to as separate surfaces. In an embodiment, the negative electrode tab 112 and the positive electrode tab 132 protrude from one of both ends from which the stacked or wound shape is exposed.

As illustrated in FIG. 1, the case 300 may be a pouch- or pocket-type. Portions of a laminate exterior material are bent so as to face each other, and a recess 310 for accommodating the electrode assembly 100 may be formed in the case 300 by pressing or drawing, for example. A sealing portion 330 is formed in an outer circumferential edge of the recess 310, and the sealing portion 330 is sealed by heat fusion or the like in a state in which the electrode assembly 100 is accommodated in the recess 310. Some of the surfaces of the recess 310 face the first surface 102 or the second surface 104, and the surfaces bent and facing each other also face the first surface 102 or the second surface 104. Thus, when the electrode assembly 100 is accommodated in the case 300, the adhesive part 170 is provided on the first surface 102 and/or the second surface 104. Thus, the electrode assembly 100 and the case 300 may be bonded to each other.

Herein, the adhesive part 170 will be described in further detail.

As illustrated in FIGS. 2 and 3, the adhesive part 170 may be provided, for example, on either the first surface 102 or the second surface 104 or on both the first surface 102 and the second surface 104. The adhesive part 170 bonds the positive electrode plate 130 and the separator 150 of the electrode assembly 100 together and also bonds the electrode assembly 100 and the inner surface of the case 300 together. That is, the adhesive part 170 serves as a binder.

The adhesive part 170 may be dispensed in a dot array shape, a pressed dot array shape, a solid line shape having rows and columns, a dotted or diagonal line shape, a zigzag shape, or the like.

In an embodiment, the adhesive part 170 may include a polymer or a mixture of two or more polymers selected from the group consisting of cellulose, polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetatepropionate, cyanoethylpullulan, cyanoethylpolyvinylalcohol, cyanoethylcellulose, cyanoethylsucrose, pullulan, carboxyl methyl cellulose, and polypropylene-maleic acid anhydride. Here, for example, the polybutylacrylate and polyacrylonitrile may be polar adhesives, and the polypropylene-maleic acid anhydride may be a non-polar adhesive.

In an embodiment, when the adhesive part 170 is formed, the adhesive part 170 may be provided to occupy at least about 30% or more of the area of the first surface 102 and/or the second surface 104. When the formation area of the adhesive part 170 is less than about 30%, the adhesion strength between the electrode assembly 100 and the case 300 may deteriorate. In an embodiment, the thickness of the adhesive part 170 may be about 1 μm to about 50 μm. When the thickness of the adhesive part 170 is less than about 1 μm, the adhesion strength between the electrode assembly 100 and the case 300 may deteriorate. When the thickness of the adhesive part 170 is greater than about 50 μm, the secondary battery 10 may become unnecessarily thick. However, the area and thickness of the adhesive part 170 are not limited to the numerical values stated above. For example, the negative electrode plate 110 or the positive electrode plate 130 are positioned on the outermost region when the electrode assembly 100 is stacked or wound, and the adhesive part 170 is formed thereon. In an embodiment, an adhesive is applied and then subjected to post-processes (HPC/DF/CP, a thermal compression process), and, accordingly, the thickness of the adhesive part 170 may become about 1 μm to about 50 μm. In an embodiment, for example, the separator 150 is positioned on the outermost region when the electrode assembly 100 is stacked or wound, and, then, the adhesive part 170 is formed thereon. In this case, an adhesive is applied and then subjected to post-processes (HPC/DF/CP, a thermal compression process), and, accordingly, the thickness of the adhesive part 170 may become about 50 µm or more.

Referring to FIGS. 1 and 2, it is not necessary for the adhesive part 170 to cover the entire width of the first surface 102 and/or the second surface 104 in the width direction. That is, the adhesive part 170 may be dispensed adjacent to the third surface 106 and the fourth surface 108, or may be dispensed spaced a distance (e.g., a predetermined distance) from the third surface 106 and the fourth surface 108. In an embodiment, the adhesive part 170 is dispensed in the longitudinal direction of the first surface 102 and/or the second surface 104, while having the area allowing the positive electrode plate 130 and the separator 150 to be bonded to each other. That is, the adhesive part 170 may be formed up to a region beyond a boundary line L1 between the positive electrode plate 130 and the separator 150 in the longitudinal direction of FIG. 3. For example, the boundary line between the positive electrode plate 130 and the separator 150 may be defined as about 0%, and an end of the separator 150 in the longitudinal direction may be defined as about 100%. In this case, the adhesive part 170 may be formed to cover at least about 20% to about 100% of a length (defined as a "residual length L2" of the separator) from the boundary line between the positive electrode plate 130 and the separator 150 to the end portion of the separator 150. For example, the residual length L2 of the separator 150 corresponding to the range of about 20% to about 100% may be about 0.4 mm to about 2 mm.

The separator 150 is longer than the positive electrode plate 130, and, thus, when the adhesive part 170 is formed up to the region beyond the boundary line L1 between the positive electrode plate 130 and the separator 150, the adhesion strength between the separator 150 and the positive electrode plate 130 may be increased. Accordingly, it is possible to minimize or reduce curling of the separator 150, separation of the positive electrode plate 130, or the like due to impact generated when the secondary battery 10 is dropped.

This will be described in further detail with reference to FIGS. 3, 4, and 5.

Figure 4:
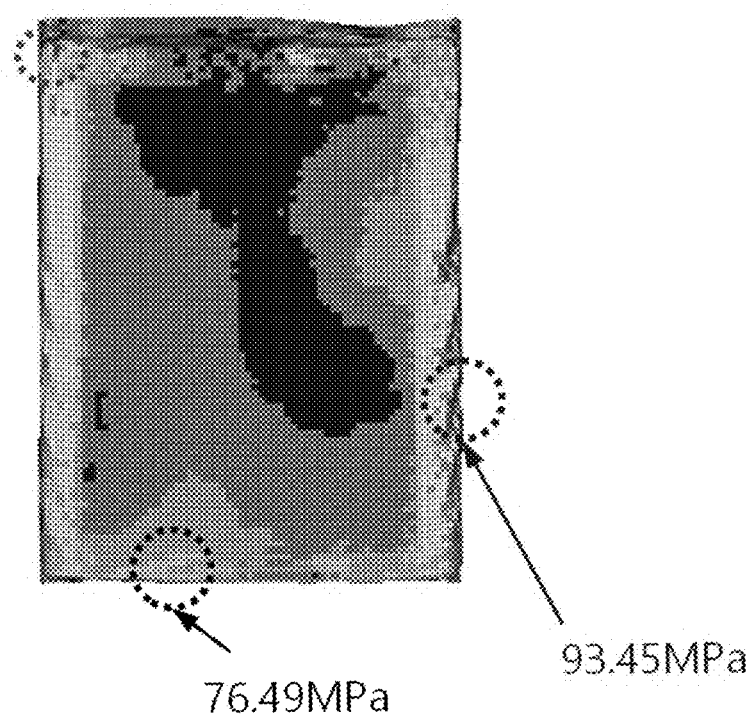
FIG. 4 is a view showing stress distribution of an electrode assembly when a secondary battery having a general structure is dropped.
Figure 5:
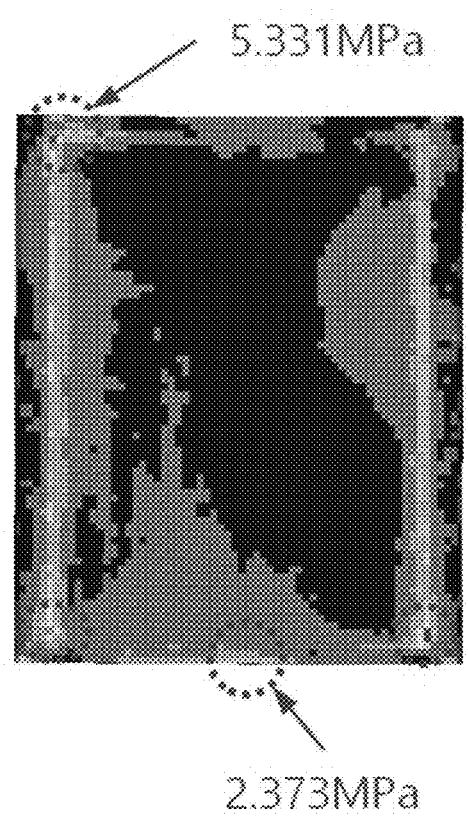
FIG. 5 is a view showing stress distribution of an electrode assembly when a secondary battery according to an embodiment of the present disclosure is dropped.

FIG. 4 is a view showing stress distribution of an electrode assembly when a secondary battery having a general structure is dropped. FIG. 5 is a view showing stress distribution of an electrode assembly when a secondary battery according to an embodiment of the present disclosure is dropped.

As illustrated in FIG. 4, it may be found that the stress distribution, which is generated in an electrode assembly when a secondary battery is dropped, is concentrated on edges of the electrode assembly. The stress of about 76 MPa is concentrated in the up-down direction of FIG. 4, and the stress of about 93 MPa is concentrated in the left-right direction.

However, the left-right direction of the electrode assembly 100 corresponds to the width direction of FIG. 3, and, in this direction, a boundary surface, in which a negative electrode plate 110, a positive electrode plate 130, and a separator 150 are stacked or wound, is not exposed (the third surface and the fourth surface of FIG. 1). However, the up-down direction of the electrode assembly 100 corresponds to the longitudinal direction of FIG. 3, and, in this direction, the boundary surface, in which the negative electrode plate 110, the positive electrode plate 130, and the separator 150 are stacked or wound, is exposed (regions except for the first to fourth surfaces of FIG. 1). Also, the separator 150 longer than the negative electrode plate 110 and the positive electrode plate 130 is in a state in which the end thereof is exposed. Thus, the separator 150 is vulnerable to external impact more in the up-down direction of the electrode assembly 100 than in the left-right direction of the electrode assembly 100.

Thus, when the adhesion strength between the electrode assembly 100 and the case 300 is reduced or a free electrolyte is increased, movement of the electrode assembly 100 inside the secondary battery 10 is increased. When the secondary battery 10 is dropped, the stress generated in the left-right direction of the electrode assembly 100 is greater than the stress generated in the up-down direction. However, the portions in the up-down direction are vulnerable to the impact, and, thus, the separator 150 may be curled or separated due to even smaller stress than the stress in the left-right direction. In this case, the electrode assembly 100 may move, or the positive electrode plate 130 may come into contact with the negative electrode plate 110. Accordingly, a short circuit may occur. When the short circuit occurs, damage to the case 300 and leakage of the electrolyte due to heat generation, thermal runaway due to ignition, or the like may occur.

However, according to embodiments of the present invention, the adhesive part 170 is formed to be able to sufficiently cover the boundary line L1 between the positive electrode plate 130 and the separator 150 and the regions of the residual length L2 as illustrated in FIG. 3. As illustrated in FIG. 5, when the adhesive part 170 according to an embodiment of the present disclosure is applied, the stress generated in the electrode assembly 100 when dropped is significantly reduced. Even in the same conditions as FIG. 4, the stress generated in the up-down direction of FIG. 5 may be reduced to about 2.3 MPa to about 5.3 MPa. Accordingly, by applying the adhesive part 170 of the present disclosure, it is possible to minimize or reduce curling of the separator 150, separation of the positive electrode plate 130, or the like due to the impact generated when the secondary battery 10 is dropped.

Meanwhile, in FIG. 3, when an upper portion is defined as the upper side of the electrode assembly 100 in the longitudinal direction and a lower portion is defined as the lower side in the longitudinal direction, an upper tape 180 and a lower tape 190 may be attached to the upper portion and the lower portion of the electrode assembly 100, respectively. The upper tape 180 and the lower tape 190 may fix the adhesive part 170 and the separator 150. The upper tape 180 and the lower tape 190 may be arranged in the middle of the adhesive part 170 in the width direction. The upper tape 180 and the lower tape 190 may facilitate maintaining the stacked or wounded state of the electrode assembly 100 when the electrode assembly 100 is inserted into the case 300.

Generally, the electrode assembly 100 is configured such that two tapes are attached to the lower portion of the electrode assembly 100 to fix the lower end of the electrode assembly 100. In this case, the lower tapes cover most of the lower portion of the electrode assembly 100. When the adhesive part 170 is formed under the state described above, the adhesion strength between the positive electrode plate 130 and the separator 150 in the lower portion of the electrode assembly 100 deteriorates. Thus, the effect of extending the adhesive part 170 in the up-down direction of the electrode assembly 100 may not be realized. Thus, according to an embodiment of the present disclosure, a structure in which the lower tape 190 is minimized or reduced in size is provided to perform a function of maintaining the insertability of the electrode assembly 100.

Instead, the adhesive part 170 has a function of protecting the electrode assembly 100 when dropped.

According to embodiments of the present disclosure as described above, a structure is provided to minimize or reduce the size of the tape that maintains the shape of the electrode assembly when the electrode assembly is inserted into the case, and this structure maximizes or increases the area of the adhesive part. Accordingly, the tape performs a function of maintaining the insertability, and the protection of the electrode assembly when the secondary battery is dropped is performed by the adhesive part. The formation area of the adhesive part is large to prevent or substantially prevent a short circuit due to curling of the separator, separation of the positive electrode plate, or the like, when the secondary battery is dropped, thereby enhancing the safety against dropping of the secondary battery.

According to embodiments of the present disclosure, the bonding strength between the negative electrode, the separator, and the positive electrode within the electrode assembly is enhanced, and, thus, curling or separating of the separator may be minimized or reduced even when an impact occurs due to dropping. Accordingly, an internal short circuit of the electrode assembly may be prevented or substantially prevented, and, thus, heat generation or ignition when dropped may be prevented or substantially prevented.

The above-described embodiments are merely provided as example embodiments for carrying out the present disclosure, and the present disclosure is not limited to the above-described embodiments, and the technical spirit of the present disclosure includes all ranges of technologies that may be variously modified by a person of ordinary skill in the art to which the present disclosure pertains, without departing from the scope of the present disclosure as set forth in the following claims.

What is claimed is:

1. A secondary battery comprising:
   an electrode assembly comprising a first electrode plate, a second electrode plate, and a separator between the first electrode plate and the second electrode plate;
   a case configured to accommodate the electrode assembly; and
   an adhesive part on an outermost region of the electrode assembly,
   wherein, in a longitudinal direction of the electrode assembly, the separator extends longer than at least one of the first electrode plate or the second electrode plate so as to extend beyond a boundary line between the separator and an end of the at least one of the first electrode plate or the second electrode in the longitudinal direction,
   wherein the adhesive part is adjacent to an end of the separator beyond the boundary line, and is bonded to the case in a state in which the electrode assembly is accommodated in the case, and
   wherein the electrode assembly further comprises a tape which is attached to an end on the adhesive part adjacent to the boundary line between the negative electrode plate and the separator or between the positive electrode plate and the separator.

2. The secondary battery of claim 1, wherein the electrode assembly comprises:
   a first surface and a second surface positioned in outermost regions of the electrode assembly and facing away from each other; and
   a third surface and a fourth surface, which have smaller areas than the first surface and the second surface and connect the first surface to the second surface,
   wherein the adhesive part is on at least one of the first surface and the second surface.

3. The secondary battery of claim 2, wherein the adhesive part covers a region of 20% to 100% of a length which is from the boundary line between the separator and the first or second electrode plate to the end of the separator.

4. The secondary battery of claim 2, wherein an area of the adhesive part is 30% or more of an area of the first surface or the second surface.

5. The secondary battery of claim 1, wherein a thickness of the adhesive part is 1 μm to about 50 μm.

6. The secondary battery of claim 1, wherein the case comprises:
   a recess which is an accommodation space configured to accommodate the electrode assembly; and
   a sealing portion which is at an outer circumferential edge of the recess and sealed after the electrode assembly is accommodated,
   wherein the case has a surface that faces the adhesive part.

\* \* \* \* \*